Oct. 23, 1956 C. S. JOHNSON ET AL 2,767,639
VENTILATING SYSTEM
Filed Sept. 16, 1952 2 Sheets-Sheet 1
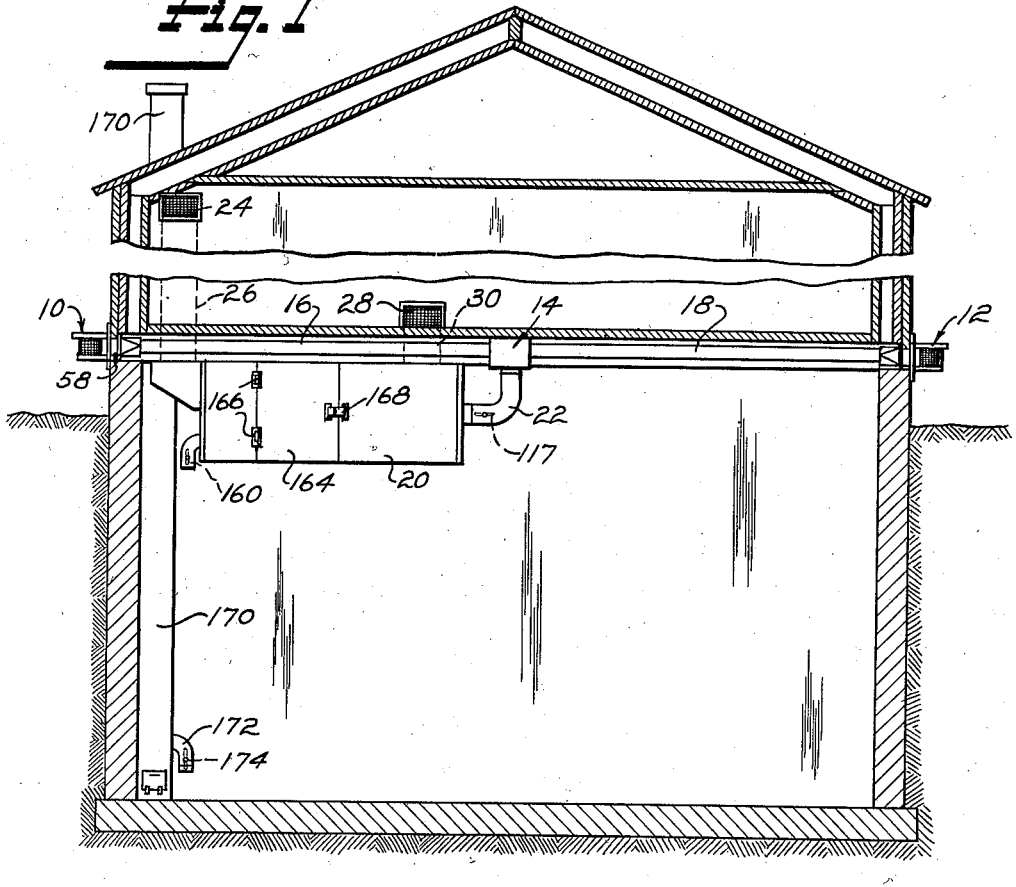
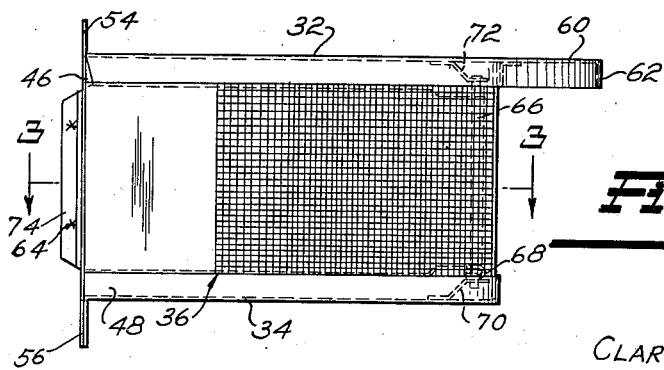
INVENTORS
CLARENCE S. JOHNSON
ROBERT G. McELROY
BY Strauch, Nolan & Diggins
ATTORNEYS

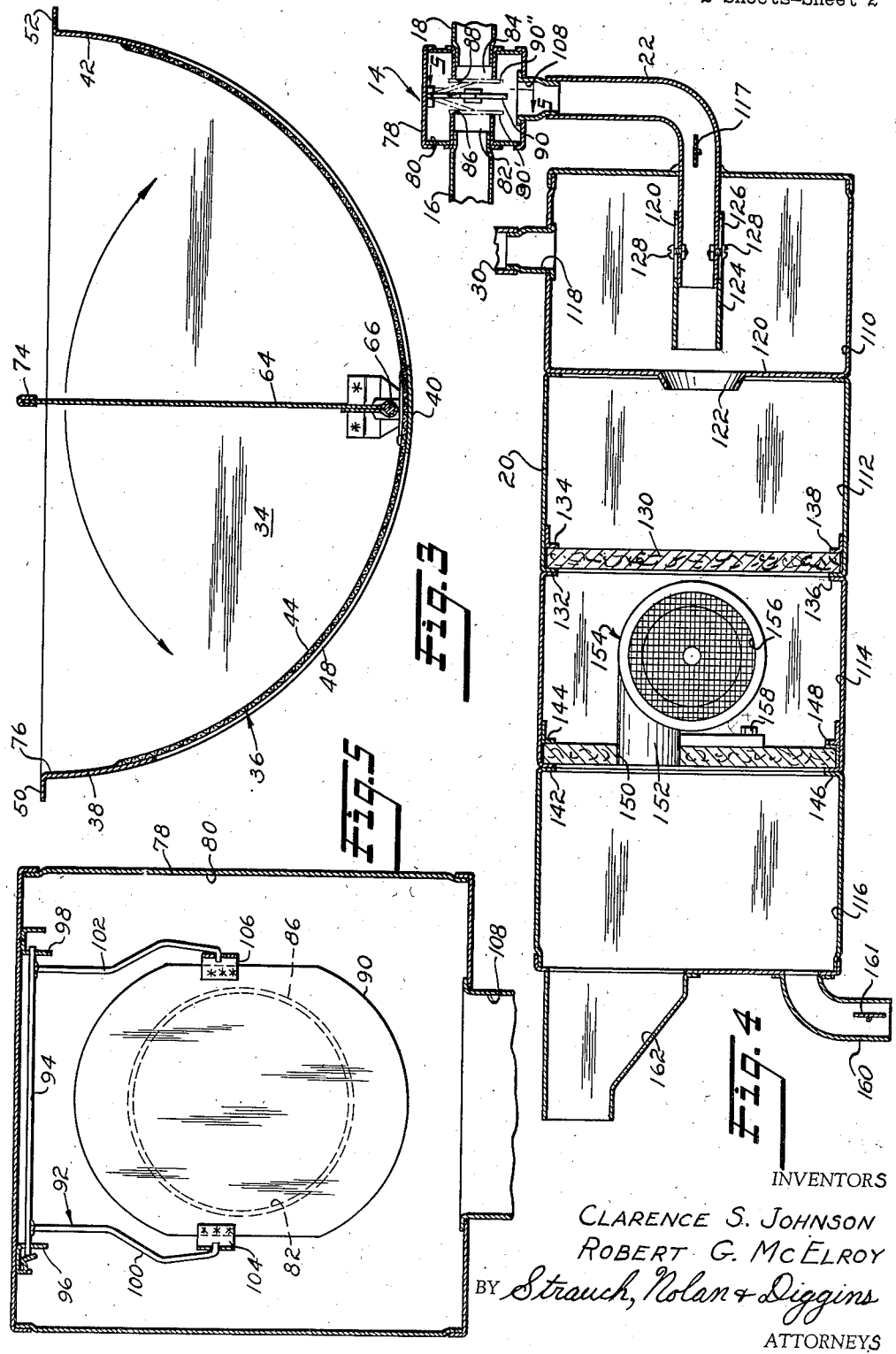

United States Patent Office 2,767,639
Patented Oct. 23, 1956

2,767,639

VENTILATING SYSTEM

Clarence S. Johnson and Robert G. McElroy, Kearney, Nebr.; said McElroy assignor to said Johnson Application September 16, 1952, Serial No. 309,824

8 Claims. (Cl. 98—38)

The present invention relates to ventilating systems for buildings and the like and more particularly to improvements in ventilating systems which result in ease and economy in the manufacture and installation of the apparatus of such systems, automatic distribution of air throughout the building to eliminate stagnant air and the stratification of heated air, the controlled and proper interchange of stale and fresh air for the health and comfort of the occupants of the building, and in the equalization of air pressure within and without the building to minimize loss of heat by outward convection of heated air from the building.

It has been found that the proper and controlled ventilation of a building, in addition to providing greater comfort to the occupants of the building, is the foremost factor in securing efficiency in operation of the building heating plant.

It is therefore a primary object of this invention to provide an automatic ventilating system for a building which properly ventilates the building and increases the efficiency of the building heating plant by positively admitting fresh air for fuel combustion under all atmospheric conditions and, at the same time, supplying additional fresh air for cross ventilation and pressuration of the building interior to the proper extent.

It is a general object of the invention to produce a building ventilating system in which flue down drafts are eliminated, cross ventilation air changes controlled, recirculated and fresh air filtered and stratification of heat eliminated.

Another general object is to provide a building ventilating system in which the pressure within the building is maintained equal to the external pressure regardless of wind direction and velocity.

More specifically it is an object of our invention to provide, in a building ventilating system, a novel fresh air intake control structure which is automatically adjusted in accordance with the direction of wind relative to the building to assure induction of fresh air into the ventilating system and which is automatically operative in response to the differential in pressure between the windward and leeward sides of the building to connect the ventilating system to an air inlet at the windward side of the building and disconnect the system from air inlets to the ventilating system at the leeward side of the building to thus assure proper internal pressuration of the building.

A further object of our invention is to provide a novel and improved air ventilating system for automatically metering the relative proportions of fresh air and recirculated air distributed through the building and which in addition is automatically operative to control the internal pressuration of the building in response to variations in the air pressure and wind velocity without the building.

These and other objects of our invention will become more fully apparent by reference to the appended claims and as the following detailed description proceeds in reference to the accompanying drawings:

Figure 1 is a schematic sectional view of a building illustrating our improved ventilating system as installed in the basement of such a building;

Figure 2 is a side elevation view of our improved fresh air intake louver which automatically compensates for variations in the angle of wind impingement upon the building to assure proper induction of fresh air into the building;

Figure 3 is a sectional view taken along the line 3—3 of Figure 2 of the air intake louver;

Figure 4 is a longitudinal sectional view through the air intake control valve and combined air mixing filtering and discharge unit of our ventilating system; and Figure 5 is a sectional view of the air intake control valve taken substantially along the line 5—5 of Figure 4.

Referring now to the drawings in detail and particularly to Figure 1, our ventilating system is illustrated in its entirety as it would be mounted adjacent the ceiling of the basement of a building. As will become fully apparent as this description proceeds, our ventilating system is formed of components which can be mounted in various positions and in various locations throughout the building in accordance with the needs of the building structure. For example, if the building has no basement, the several components of the ventilating system can be mounted within the attic space above the top floor of the building. As illustrated in Figure 1 our ventilating system is installed in a building having a heating system other than a hot air heating system so that installation of air distribution ducts and registers in the building as a part of the ventilating system is required. If a hot air heating system is used, the ducts and registers of that system may be used for air distribution in the ventilating system.

Our ventilating system is shown to comprise fresh air intake louvers 10 and 12 mounted on opposite walls exteriorly of the building, a fresh air intake control valve 14 which is connected by air ducts 16 and 18 to the fresh air intake louvers 10 and 12 respectively, a combined air mixing, filtering and discharge unit 20 to which the outlet of the fresh air intake control valve 14 is connected by a duct 22, air outlet registers 24 mounted on the side wall of the rooms of the building adjacent the ceiling and connected by an air distribution duct 26 to the outlet end of the unit 20, and an air return register 28 located adjacent the floor of the rooms of the building and connected by air return duct 30 to the inlet end of the unit 20.

The construction of the air intake louvers 10 and 12, which is best shown in reference to Figures 2 and 3, provides what is in effect an air scoop which is automatically adjusted in accordance with the direction of the wind to direct air into the ventilating system. Each of these louvers comprises a top wall 32 and a bottom wall 34 which are preferably in spaced parallel relation and imperforate, and a perforate side wall 36 which is preferably of semi-cylindrical form extending between and normal to the parallel top and bottom walls 32 and 34. Perforate wall 36 is formed by three spaced reinforcing members 38, 40 and 42, which extend between the top wall 32 and the bottom wall 34 and which are rigidly secured thereto as by brazing, and by a screen 44 of segmental cylindrical configuration likewise extending between the top wall 32 and the bottom wall 34 and suitably secured to each of the reinforcing members 38, 40 and 42. The top and bottom walls 32 and 34 are provided respectively with downwardly and upwardly directed aligned segmental cylindrical flanges 46 and 48 to which the reinforcing members 38, 40 and 42 and the screening 44 are fixed to provide a rigid assembly.

The reinforcing members 38 and 42 and the top and bottom walls 32 and 34 are each provided with outturned mounting flanges designated 50, 52, 54 and 56 respectively all of which lie in a common plane normal to the planes of top and bottom walls 32 and 34. As is best shown in Figure 1, the air intake louvers are secured exteriorly of the side wall of the building in alignment with an opening 58 therethrough to permit introduction of air into the building. The top wall 32 is provided with an extention 60 formed at the outer edge with a down turned flange 62 to shield the perforate wall 36 from rain or snow.

As has previously been indicated, the louvers 10 and 12 project beyond the exterior wall of the building. It is apparent that if merely a shielded opening is provided as an air intake louver, if the direction of wind impingement upon the building is parallel to or substantially parallel to the wall upon which the louver is mounted, not only will no air be forced into the building, but the passing air will, due to its velocity, tend to reduce the pressure of the air within the building. In order to overcome this disadvantage, I have provided an air deflector which is automatically positioned in accordance with the angle of incidence of wind upon the building to direct the passing air into the building through the air intake louver. For this purpose an air deflector plate 64 is pivotally mounted upon a shaft 66 the axis of which is normal to the planar top and bottom walls 32 and 34 and which is located adjacent and preferably at the mid-point of the arcuate length of the semi-cylindrical perforate wall 36 as is most clearly shown in Figure 5. Shaft 36 is mounted at its lower end by a thrust bearing structure 68 supported by a bracket 70 fixed to the bottom wall 34 and at the top by a bearing bracket 72 fixed to the top wall 32. The deflector plate 64 is of light sheet metal construction and the bearings for shaft 36 are of low friction construction so that the plate 64 will pivot to a position about the axis of shaft 66 in which it lies in the path of the air striking the air intake louver.

An end cap 74 of U-shaped cross section is secured along the entire length of the free edge of plate 64 by welding or brazing. At the extreme ends in the path of pivotal movement of the plate 64, cap 74 will strike the screening 44 and the arcuate upper and lower flanges 46 and 48 to retard further pivotal movement of the plate 64. When so pivoted to either of its extreme positions by the wind impinging upon plate 64, plate 64 will deflect the air stream entering the intake louver through the screen 44 at the side of the louver opposite that to which plate 64 has pivoted into the building through the generally rectangular openings 76 defined between the top wall 32, the bottom wall 34 and the reinforcing members 38 and 42.

As has been pointed out in reference to Figure 1, the fresh air intake louvers 10 and 12 are connected to the fresh air intake control valve 14 by ducts 16 and 18 respectively so that air introduced into the building through the openings 76 of the air intake louvers will be directed through such ducts to the centrally located air intake control valve. The structure of the air intake control valve 14 is best illustrated in Figures 4 and 5. The fresh air intake control valve 14 is provided with a casing 78 which is preferably formed of sheet metal to define a generally cubical or rectangular inner chamber 80 which is provided with air intake openings 82 and 84 to which the ducts 16 and 18 are respectively connected and which terminate within the chamber 80 in coaxially aligned, parallel spaced valve faces 86 and 88 respectively. When the air control valve 14 is mounted in its operative position, the valve faces 86 and 88 preferably lie in vertical planes. A valve member 90, which is preferably of plate like construction is mounted midway between the valve faces 86 and 88 for pivotal movement into engagement with either of such valve faces as is indicated by the phantom line positions 90' and 90'' of the valve member 90.

The mounting of valve member 90 is best illustrated in Figure 5 wherein it is seen that it is mounted upon a support 92 which includes a shaft 94 pivotally mounted between bearing brackets 96 and 98 fixed to the top wall of the casing 78 midway between the planes of the valve faces 86 and 88. Shaft 94 is preferably horizontal when the control valve 14 is mounted in operative position within the building. Support 92 is provided with downwardly extending arms 100 and 102 which are fixed at the upper ends to the shaft 94 and which straddle the valve member 90, valve 90 being provided with aligned bearing brackets 104 and 106 which are located above the center of gravity of the valve member 90 and which are coaxially apertured to receive the ends of the arms 100 and 102 to pivotally support the valve member 90 relative to the valve member support 92. As so mounted and in the absence of an air pressure differential between the opposite sides thereof, valve member normally hangs from support 92 in a vertical position.

As is apparent by reference to Figure 4, the valve member 90 lies in a path of a stream of air entering through duct 16 or 18. When, for example, air intake louver 10, to which intake duct 16 is connected, is on the windward side of the building and air intake louver 12 to which duct 18 is connected, is on the leeward side of the building, due to the differential in air pressure between the ducts 16 and 18, valve member 90 will pivot relative to support 92 and support 92 will pivot relative to its bearing brackets 96 and 98 to positions 90'' to which the valve member 90 abuts against the valve face 88 to close the passageway between chamber 80 and the leeward connected duct 18. In this position 90'', valve member 90 prevents outward movement of air from chamber 80 through duct 18 and deflects the air coming in through duct 16 downward through the outlet opening 108 of the chamber 80. Reversal of the wind direction causes valve member 90 to swing to the position 90' to close inlet 82 and direct air entering through inlet 84 toward outlet 108. It should be noted that the outlet opening 108 need not be located below the valve member 90 but may be located at either side with equal effectiveness.

The air mixing, filtering and discharge unit 20 to which the outlet opening 108 of the air intake control valve 14 is connected by a duct 22 is best illustrated in Figure 4. The unit 20 is preferably formed of sheet metal structure defining basically three chambers: an air intake chamber 110, an air mixing chamber 112 and an air discharge chamber 114 and having in addition an air outlet plenum 116. The chambers 110, 112, 114 and the plenum 116 are, in the preferred construction, aligned and of generally rectangular cross section.

As is shown in Figure 4, the duct 22 leading from the outlet opening 108 of the fresh air intake control valve 14 is provided with a damper 117 for controlling flow therethrough and opens into chamber 110 as does recirculated air inlet opening 118 to which the duct 30 leading from the air return register 28 is connected. A partition 120 separating chambers 110 and 112 is formed centrally with an orifice 122 which is preferably of conical form and which converges toward chamber 112. The outlet end of the duct 22 is preferably coaxially aligned with the orifice 122 to direct fresh air therethrough. A nozzle in the form of a sleeve 124 is received over the outlet end of the duct 22 and mounted thereon for axial movement relative to the orifice 122 to control the size of the annular opening defined between the conical wall of the orifice 122 and the adjacent edge of sleeve 124. By varying the size of the annular opening thus defined the relative proportion of fresh air introduced through duct 22 to recirculated air introduced into chamber 112 from chamber 110 is controlled. Sleeve 124 is formed with longitudinally extending slots 126 which cooperate with bolt assemblies 128 to provide this axial adjustment of sleeve 124. In accordance with the adjusted position of the sleeve 124 a predetermined proportion of fresh air and recirculated air is introduced into the mixing chamber 112 through the orifice 122.

Chambers 112 and 114 are separated by a bat 130 of filtering material supported at its top between rectilinear guides 132 and 134 and at its bottom between guides 136 and 138. While air can pass readily through filtering bat 130 it tends to retard the passage of air between chambers 112 and 114 to a certain extent relative to its velocity on entry through orifice 122 to thereby assure the proper intermixture of the recirculated air and fresh air within the chamber 112 and to filter dust from the air before it passes to the chamber 114.

The chamber 114 and the outlet air plenum 116 are separated by a plate-like member 140 formed of suitable sound deadening or absorbing material. Member 140 is received between rectilinear guides 142 and 144 at its top and 146 and 148 along its bottom edge. Member 140 is formed with a through aperture 150 extending between the chamber 114 and the plenum 116 in which is received the discharge duct 152 of a conventional blower 154 provided with an axial inlet 156 and a tangential outlet duct 152. The blower 154 is secured to the member 140 as by bolts 158. The intermixed air received in the chamber 112 is drawn through the filtering bat 130 into chamber 114 and through the axial inlet 156 of the blower 154 and discharged through the tangential outlet duct 152 through the opening 150 into the discharge plenum 116. The discharge plenum 116 is provided with a first outlet 160 controlled by a damper 161 permitting discharge of the air therefrom into the basement of the building from whence it is utilized by the building heating plant and a second discharge outlet 162 which is connected through one or more distribution registers 24 which are suitably located throughout the various rooms of the building adjacent the ceiling in each of such rooms to assure adequate ventilation and air turbulence to eliminate heat stratification.

Referring to Figure 1, it will be noted that the unit 20 is provided with a door 164 hinged at 166 and provided with a latch 168. Door 164 extends along the length of the unit 20 from a position to the left of the guides 142 and 146 as viewed in Figure 4 and to the right of guides 134 and 138 as viewed in that figure, so that when the door 164 has been opened the air filtering bat 130 can be slid out of the unit between the guides supporting it through the door for replacement and the member 140 can be similarly slid from the unit through the open door 164 for cleaning or servicing of the blower 154.

While air for cross ventilation can be released directly through the outside wall of the building, in buildings which have a basement, the room air adjacent the floor of the basement is preferably released through the flue stack 170. For this purpose, a duct 172 having a damper 174 therein is provided near the base of the flue stack 170. This duct 172 is open at its inlet end to the atmosphere within the basement and at its outlet end to the interior of the flue stack.

From the foregoing detailed description it is apparent that fresh air is introduced into the building through the windward one of the air intake louvers 10 or 12 while the leeward one of such louvers is sealed from the system so that there is no tendency for air to be drawn from the building through such leeward louver. The fresh air passes from the windward intake louver through the air intake control valve 14 into the chamber 110 where it is discharged through the orifice 122 into the mixing chamber 112 being intermixed in such chamber 112 with recirculated air from within the building which is introduced into the chamber 110 and drawn into the chamber 112 through the orifice 122 by the movement of the fresh air through such orifice, the relative proportion of recirculated air and fresh air being controlled by the axial position of the nozzle sleeve member 124 relative to the conical surface defining the orifice 122. The recirculated air and fresh air introduced into chamber 112 through the orifice 122 is intermixed within the chamber 112 due to the reduction in velocity of air therein resulting from the inhibiting action of the air filtering bat 130 separating chambers 112 and 114. The air passing through the filtering bat 130 into the chamber 114 is pressurized for distribution throughout the building through suitable distribution ducts 26 by the blower 154.

In buildings having heating plants wherein there is no forced air blower, as on gravity circulation furnaces or radiant systems, the entire ventilation system as shown is installed. However, where the forced air heating system is being equipped with our ventilation system, we tie in with the blower and filter system on the forced air furnace and eliminate duplication of any similar functions in the ventilation unit itself.

Where our ventilation system is installed in a building having no forced air heating system such as gravity or space heaters, then the circulation forced by the ventilation system does, to a satisfactory degree, provide air turbulence through proper sizing of the ventilation blower 154 sufficient to attain a ceiling to floor temperature differential minimum comparable to that of a forced air heating system and thereby enable most accurate thermostatic control of fuel input.

It has been found that through proper ventilation by the use of our improved ventilating system along with the correction of any deficiencies in the heating plant installation will result in a greatly increased fuel efficiency in buildings having inadequate or no system of ventilation, in some cases resulting in a saving of up to 30% on the fuel bill.

This ventilation system on any type heating plant filters intake air, inasmuch as all fresh incoming air as well as recirculated air is filtered. The turbulence minimizes the stratification of heat and extraneous matter, reduces symptoms of excessive humidity such as steamed windows, provides constantly metered cross ventilation, eliminates the necessity of opening any windows or doors for ventilation purposes and is fully automatic in operation regardless of the wind direction or velocity or barometric conditions.

Intake fresh air is always drawn in from the windward side of the building which, with proper venturi setting of the nozzle sleeve member 124 continually stabilizes internal pressuration of the building. The intake louvers may be installed at proper locations through any outside walls or roof sections as is found to be convenient.

Our ventilation units are easily installed, economical to manufacture, require very little space, usually in either the basement or the attic, are concealed from the living quarters in homes or working quarters of other buildings, and require a minimum of maintenance attention, lubrication of the blower 154 and the replacement of the filtering bat 130 as required being the only maintenance necessary.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A building ventilating system including at least a pair of fresh air intake louvers mounted on the opposite sides of the building, means for mixing the fresh air received through said louvers with air from within the building, means for distributing the air mixture throughout the building, and a fresh air intake control valve interposed between said intake louvers and said air mixing means to direct the inflow of air from the windward fresh air intake louver to said mixing means and disconnect the leeward louver from said mixing means, said valve assembly comprising a casing having a pair of opposed inlet openings terminating in spaced valve seats lying in parallel substantially vertical planes when the assembly is mounted in operating position, and an outlet opening spaced from said inlet openings, a valve support pivotally mounted centrally between the planes of said valve seats about a horizontal axis parallel to such planes, and a valve member mounted upon said support between said valve seats for pivotal movement therewith and relative thereto about an axis parallel to the pivot axis of said support into engagement with either of said valve seats, said valve and said support being of such light weight construction that, upon the application of air pressure to said valve through inlet opening connected to the windward louver, the valve and support will pivot to a position in which said valve engages the valve seat of the leeward connected inlet opening to close such opening and direct air from the windward connected inlet opening through said casing and said outlet opening to said mixing means.

2. In a ventilating system for a building, a fresh air intake control valve assembly adapted to control the inflow of air from a pair of fresh air intake louvers disposed at opposite sides of the building and connected to said valve assembly, said valve assembly comprising a casing having a pair of opposed inlet openings terminating in spaced valve seats lying in parallel substantially vertical planes when the assembly is mounted in operating position and an outlet opening spaced from said inlet openings, a valve support pivotally mounted centrally between the planes of said valve seats about a horizontal axis parallel to such planes, and a valve member mounted upon said support between said valve seats for pivotal movement therewith and relative thereto about an axis parallel to the pivot axis of said support into engagement with either of said valve seats said valve and said support being of such light weight construction that, upon the application of air pressure to said valve through the inlet opening connected to the windward louver, the valve and support will pivot to a position in which said valve engages the valve seat of the leeward connected inlet opening to close such opening and direct air from the windward connected inlet opening through said casing to said outlet opening.

3. In a building, a ventilating system comprising a pair of fresh air intake louvers mounted on the opposite sides of the building, a fresh air intake control valve having spaced inlets, conduit means connecting said louvers to said inlets, said control valve housing having an air outlet, a valve member movably mounted in said housing between said inlets and automatically operative under control of the air pressure at said louvers to close the connection between the leeward louver and said valve and to direct air from the windward louver to said valve outlet, a mixing chamber, means for withdrawing air from said building, conduit means connecting said valve outlet and said mixing chamber, means for introducing building air and fresh air into said mixing chamber in separate concentric streams in controlled relative proportions, a discharge chamber, a filter separating said mixing chamber from said discharge chamber to retard the passage of air between said chambers thereby producing thorough intermixing of the fresh and building air in said mixing chamber and to filter the air mixture, said discharge chamber being formed with a discharge opening; and a blower mounted within said discharge chamber and directing air through said discharge opening to thus induce circulation of air through said chambers.

4. In a ventilating system for a building, a compact assembly for mixing air from within the building and fresh air from without the building comprising a sheet metal structure defining three separate chambers, means for controlling the relative proportion of intermixed building air and fresh air including a partition separating a first and second of said chambers, means on said partition defining an orifice converging toward said second chamber, a nozzle mounted within said first chamber in alignment with said orifice for movement relative thereto for controlling the spacing between the exterior of said nozzle and the wall of said orifice to thereby vary the size of the annular opening between said nozzle and said orifice defining means relative to the size of the opening of said nozzle, means for introducing fresh air into said nozzle for discharge therefrom through said orifice and means for introducing building air into said chamber; a filter separating said second chamber from the third of said chambers to retard the passage of air between said second and third chambers thereby producing thorough intermixing of the fresh and building air in said second chamber and to filter the air mixture, said third chamber being formed with a discharge opening; and a blower mounted within said third chamber and directing air through said discharge opening to thus induce circulation of air through said chambers.

5. In a ventilating system for a building, a compact assembly for mixing air from within the building and fresh air from without the building comprising a sheet metal structure defining three separate chambers, means for controlling the relative proportion of intermixed building air and fresh air comprising a partition separating a first and second of said chambers and having means thereon defining an orifice converging toward said second chamber, a nozzle mounted within said first chamber in alignment with said orifice for movement relative thereto for controlling the spacing between the exterior of said nozzle and the wall of said orifice to thereby vary the size of the annular opening between said nozzle and said orifice defining means relative to the size of the opening of said nozzle, means for introducing fresh air into said nozzle for discharge therefrom through said orifice and means for introducing building air into said chamber; a filter separating said second chamber from the third of said chambers to retard the passage of air between said second and third chambers thereby producing thorough intermixing of the fresh and building air in said second chamber and to filter the air mixture, said third chamber being formed with a discharge opening; and a blower mounted within said third chamber and directing air through said discharge opening to thus induce circulation of air through said chambers, said sheet metal structure being formed with a single access opening through which both said filter and said blower can be removed for replacement and servicing respectively and including a closure member for said access opening.

6. In a building, a ventilating system comprising a pair of fresh air intake louvers mounted on opposite sides of the building, a fresh air intake control valve housing within said building, fresh air inlets on opposite sides of said intake control valve housing, conduit means connecting the intake louvers to said inlets, a valve member freely movably mounted in said housing between said inlets so that fresh air entering through one inlet moves the valve member to close the other inlet, said intake control valve housing having a fresh air outlet, an air mixing chamber, conduit means for connecting the air mixing chamber to the building, conduit means connecting the fresh air outlet to the air mixing chamber, and means for distributing air from the mixing chamber throughout the building.

7. A ventilating system as defined in claim 6 including means for varying the proportion of fresh air to building air in the mixing chamber.

8. A ventilating system as defined in claim 7 including means for filtering the air from the mixing chamber before distributing the air through the building.

(References on following page)

References Cited in the file of this patent

UNITED STATES PATENTS

| | | | |
|---|---|---|---|
| 5,958 | Ruttan | Dec. 5, | 1848 |
| 74,534 | Hitchcock | Feb. 18, | 1868 |
| 518,984 | Zimmerman | May 1, | 1894 |
| 532,452 | Elwell | Jan. 15, | 1895 |
| 802,871 | Matton | Oct. 24, | 1905 |
| 874,521 | March | Dec. 24, | 1907 |
| 2,131,725 | Chester | Oct. 4, | 1938 |
| 2,190,002 | Townsend | Feb. 13, | 1940 |
| 2,418,266 | Kurth et al. | Apr. 1, | 1947 |
| 2,422,560 | Palmer | June 17, | 1947 |